United States Patent
Branda et al.

(10) Patent No.: US 8,060,812 B2
(45) Date of Patent: Nov. 15, 2011

(54) METHODS, SYSTEMS, AND COMPUTER PROGRAM PRODUCTS FOR CLASS VERIFICATION

(75) Inventors: Steven J. Branda, Rochester, MN (US); John J. Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1144 days.

(21) Appl. No.: 11/829,154

(22) Filed: Jul. 27, 2007

(65) Prior Publication Data
US 2009/0031202 A1   Jan. 29, 2009

(51) Int. Cl.
    *H03M 13/00* (2006.01)
(52) U.S. Cl. .......... 714/807; 714/124; 714/126
(58) Field of Classification Search .......... 714/807, 714/124, 126, 38, 45
    See application file for complete search history.

(56) References Cited

U.S. PATENT DOCUMENTS

| 6,427,223 | B1 * | 7/2002 | Kim et al. ........... 324/762.02 |
| 6,618,855 | B1 * | 9/2003 | Lindholm et al. ....... 717/126 |
| 2005/0119052 | A1 * | 6/2005 | Russell et al. ........... 463/42 |

* cited by examiner

*Primary Examiner* — Fritz Alphonse
(74) *Attorney, Agent, or Firm* — Cantor Colburn LLP

(57) ABSTRACT

A system for class verification includes a data storage device holding verification caches; and a host system in communication with the data storage device, the host system executing a virtual machine (VM), including a class verifier. The VM is configured to perform: initiating loading of a class; searching for the class in the verification caches, wherein a record from the verification caches, including a checksum, is returned upon locating the class; comparing the checksum in the record to a checksum of the class being loaded; completing the loading of the class when the checksums match; performing bytecode verification of the class upon one of: a checksum comparison mismatch, and a failure to locate the class in the verification caches; calculating new checksum of the class upon a successful bytecode verification; and storing the new checksum in the verification caches.

20 Claims, 5 Drawing Sheets

METHODS, SYSTEMS, AND COMPUTER PROGRAM PRODUCTS FOR CLASS VERIFICATION

BACKGROUND OF THE INVENTION

The present disclosure relates generally to computer software class verification, and, in particular, to class verification using caching for improved class-loading performance.

One of the more time consuming operations while loading software classes, such as Java™ classes, is class verification. During class verification, a virtual machine (VM), such as a Java™ virtual machine (JVM™), scans the class being loaded to ensure that bytecode and class constructs conform to the programming language standard of the VM. Class verification can improve security, because it can prevent a malicious class from accessing data that it should not have access to. Class verification also ensures that malformed classes do not compromise the operation and stability of the VM. Unfortunately, a major drawback to class verification is the associated processing overhead that can result in a system startup delay. For example, existing class verification techniques may account for upwards of 10% or more of system initialization time, thereby reducing system responsiveness and availability.

One technology that may decrease class verification time for Java™ applications is a J9 executable (JXE). Using a JXE, classes may be verified and loaded into a JVM™. The internal JVM™ representation can then be stored to a binary file, essentially creating an executable library from the Java™ program. One problem with JXEs is that Java™ classes must be preprocessed to generate and verify the JXE files. If a class is changed or the application is upgraded, then the JXEs also need to be regenerated. Since a single JXE usually contains numerous classes that must be loaded entirely into memory, JXEs may consume a larger amount of memory beyond the desired classes to load, decreasing resource utilization efficiency and increasing load time. In addition to these drawbacks, JXE technology is not supported on many Java™ developed kit platforms because of shared class constraints, resulting in compatibility issues.

Shared classes can give a VM the ability to keep a cache of loaded classes in shared volatile memory. After an application is started for the first time, it can load the classes from shared memory instead of a disk on which the classes are stored. This approach may result in a similar startup time improvement as JXEs, and is less disruptive to the Java™ programming model. However, because shared classes support seamlessly loading classes from the class cache and from the disk, most of the performance savings are related to reduced access delays, but full class verification is still required. Additionally, when a system using shared classes reboots, the class cache must be populated again from the disk, so applications do not get the performance benefit of shared classes after each reboot. Rapid startup after a system reboot is important to high availability systems, because faster application startup times result in less downtime, and thus a higher availability rating for the system. Thus, shared classes do not substantially reduce system initialization overhead time related to class verification.

Some componentization frameworks have component lifecycle features that may appear to improve verification time at startup. For example, frameworks such as the Open Services Gateway initiative (OSGi) framework may support binary verification of component bundles to ensure that a component being loaded by the framework is the same code shipped by the component provider. These features only provide limited security and cannot provide performance improvements in class loading for several reasons. First, OSGi framework implementations are made of Java™ classes that run on a Java™ platform. Therefore, they are subject to the same rules as any Java™ class. Only internal changes in the JVM™ can affect whether or not classes are verified and in what manner. Secondly, bundle verification only verifies the authenticity of the code. Java™ class verification is not performed to verify the authenticity of the binaries. It is performed to make sure that the binaries are not malformed or non-compliant to the Java™ programming language standard. However, OSGi framework implementations do not verify that the binaries will not de-stabilize the JVM™ or violate the JVM™ specification through authenticity checks. Some OSGi bundles can be very large (e.g., 50 megabytes), but most of the classes inside of them are not loaded initially. Performing binary verification on the entire bundle would likely slow down overall system performance, because only a small portion of the classes in the bundle may need to be loaded at startup. Additionally, an OSGi bundle may include files that are not subject to class verification, such as XML, properties, and configuration files, creating a verification gap for the entire OSGi bundle.

Therefore, existing techniques do not improve class-loading performance to reduce system initialization time while providing secure class verification. Accordingly, there is a need in the art for class verification with improved class-loading performance.

BRIEF SUMMARY OF THE INVENTION

Embodiments of the invention include a method for class verification. The method includes initiating loading of a class, and searching for the class in verification caches. A record from the verification caches, including a checksum, is returned upon locating the class. The method further includes comparing the checksum in the record to a checksum of the class being loaded, and completing the loading of the class when the checksums match. The method additionally includes performing bytecode verification of the class upon one of: a checksum comparison mismatch, and a failure to locate the class in the verification caches. The method also includes calculating a new checksum of the class upon a successful bytecode verification, and storing the new checksum in the verification caches.

Additional embodiments include a system for class verification. The system includes a data storage device holding verification caches, and a host system in communication with the data storage device. The host system executes a virtual machine (VM), including a class verifier. The VM initiates loading of a class, and searches for the class in the verification caches. A record from the verification caches, including a checksum, is returned upon locating the class. The VM further compares the checksum in the record to a checksum of the class being loaded, and completes the loading of the class when the checksums match. The VM additionally performs bytecode verification of the class upon one of: a checksum comparison mismatch, and a failure to locate the class in the verification caches. The VM also calculates a new checksum of the class upon a successful bytecode verification, and stores the new checksum in the verification caches.

Further embodiments include computer program product for class verification. The computer program product includes a storage medium readable by a processing circuit and storing instructions for execution by the processing circuit for implementing a method. The method includes initiating loading of a class, and searching for the class in verification caches. A record from the verification caches, including a checksum, is returned upon locating the class. The method also includes comparing the checksum in the record to a checksum of the class being loaded, and completing the loading of the class when the checksums match. The method additionally includes performing bytecode verification of the class upon one of: a checksum comparison mismatch, and a failure to locate the class in the verification caches. The method further includes calculating a new checksum of the class upon a successful bytecode verification, and storing the new checksum in the verification caches.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
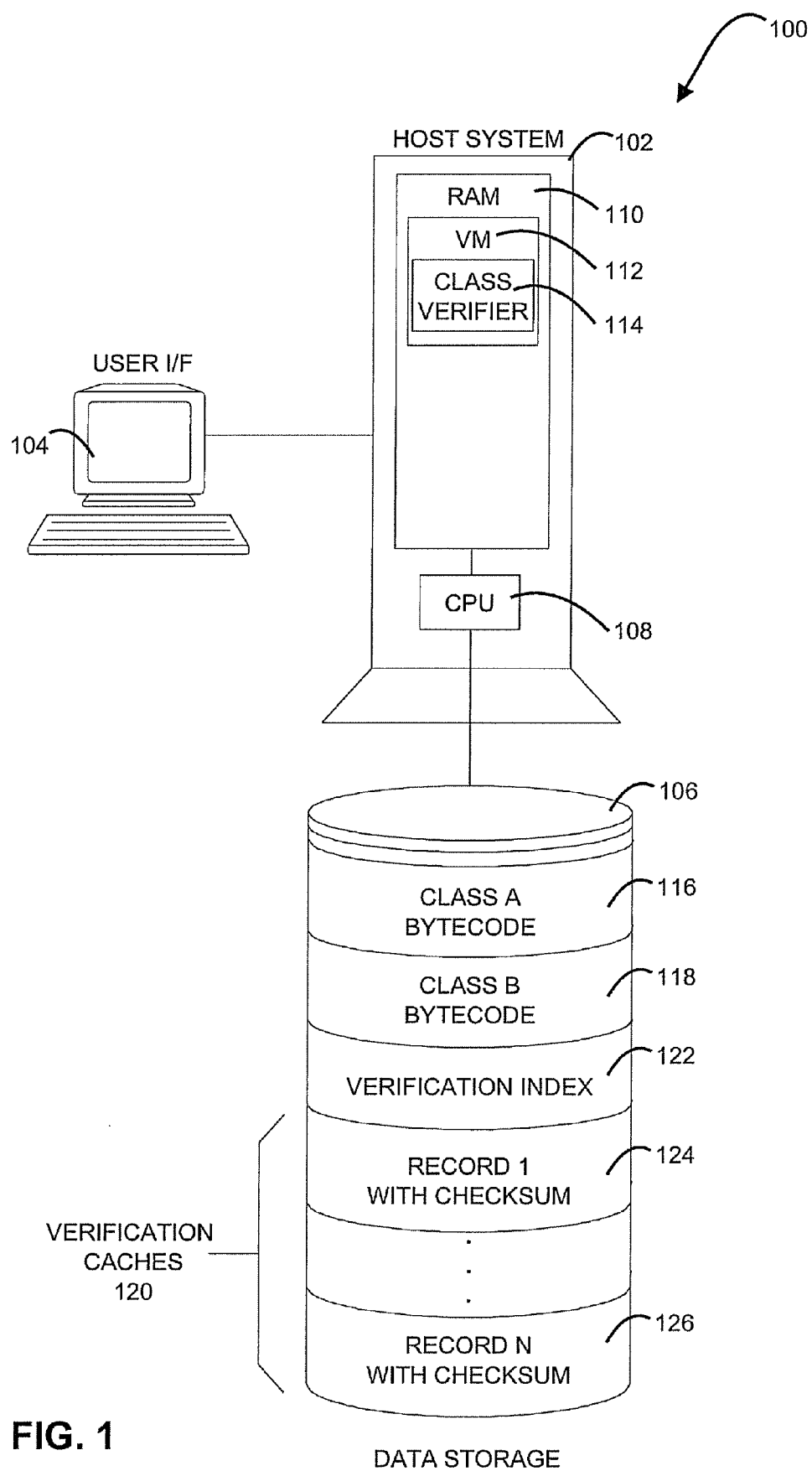
FIG. 1 depicts a system for class verification prior to class loading in accordance with exemplary embodiments.

The detailed description explains the preferred embodiments of the invention, together with advantages and features, by way of example with reference to the drawings.

DETAILED DESCRIPTION OF THE INVENTION

Exemplary embodiments, as shown and described by the various figures and the accompanying text, provide methods, systems and computer program products for class verification. Many programming languages, such as Java™, employ a virtual machine or a similar operating system interface to convert generic instructions (e.g., bytecode) organized using classes into machine specific instructions that can be executed on a host system. Class verification can be performed to protect the host system from instructions in a class that may harm the host system or otherwise interfere with program execution. In exemplary embodiments, customized class verification records are created and utilized for classes loaded using a virtual machine. The virtual machine may search for a record in verification caches associated with a class being loaded. If the class is located in the verification caches, a record is returned that includes a checksum for the class. The checksum may be any form of check word or identifier to assist in verifying the contents of the class. For example, the checksum can be a two's complement summation, a cyclic redundancy check (CRC), an XOR summation, or a correction code. The class checksum extracted from the verification cache record is compared to a checksum calculated for the class being loaded. The checksum may be calculated and compared while the class is in a compressed file format, such as a Java™ archive (JAR) file, to further optimize the process. If the checksum comparison results in a match, then the class is loaded without further verification. However, if the checksum comparison fails or no verification cache record is located for the class, then the class being loaded is bytecode verified. Bytecode verification may include techniques known in the art to verify that the bytecode complies with programming language standards, such as Java™ language standards. Upon successful bytecode verification, a record is created in the class verification caches including a checksum for the now verified class, and the updated class verification caches are saved to a data storage device.

A similar process of class verification may be applied to components, with an additional extension point tag applied to limit the number of classes verified to those that are associated with a particular component, thus limiting class verification on a per component basis. A component refers to a separable portion of a larger application, such as a plug-in that provides a particular function. Componentized applications may include a large number of classes per component and components per application. Therefore, extension point tags may be utilized as metadata to identify which classes should be verified with a particular component, consequently avoiding a wide-scale class verification effort on startup, since fewer than all components and classes may be needed for the componentized application to execute. Further details of class verification using caching for improved class-loading performance are provided herein.

Turning now to the drawings, it will be seen that in FIG. 1 there is a block diagram of a system 100 for class verification that is implemented in accordance with exemplary embodiments. The system 100 of FIG. 1 includes a host system 102 in communication with a user interface 104 and a data storage device 106. The host system 102 may be any type of computer system known in the art. For example, the host system 102 can be a desktop computer, a laptop computer, a general-purpose computer, a mainframe computer, or an embedded computer (e.g., a computer within a wireless device). In exemplary embodiments, the host system 102 executes computer readable program code. While only a single host system 102 is shown in FIG. 1, it will be understood that multiple host systems can be implemented, each in communication with one another via direct coupling or via one or more networks. For example, multiple host systems 102 may be interconnected through a distributed network architecture. The single host system 102 may also represent a server in a client-server architecture.

In exemplary embodiments, the host system 102 includes at least one processing circuit (e.g., CPU 108) and volatile memory (e.g., RAM 110). The CPU 108 may be any processing circuit technology known in the art, including for example, a microprocessor, a microcontroller, an application specific integrated circuit (ASIC), a programmable logic device (PLD), a digital signal processor (DSP), or a multi-core/chip module (MCM). The RAM 110 represents any volatile memory or register technology that does not retain its contents through a power/depower cycle, which can be used for holding dynamically loaded application programs and data structures. The RAM 110 may comprise multiple memory banks partitioned for different purposes, such as data cache, program instruction cache, and temporary storage for various data structures and executable instructions. It will be understood that the host system 102 also includes other computer system resources known in the art, and not depicted, such as one of more power supplies, clocks, interfacing circuitry, communication links, and peripheral components or subsystems.

The user interface 104 includes a combination of input and output devices for interfacing with the host system 102. For example, user interface 104 inputs can include a keyboard, a keypad, a touch sensitive screen for inputting alphanumerical information, or any other device capable of producing input to the host system 102. Similarly, the user interface 104 outputs can include a monitor, a terminal, a liquid crystal display (LCD), or any other device capable of displaying output from the host system 102.

The data storage device 106 refers to any type of storage and may comprise a secondary storage element, e.g., hard disk drive, tape, or a storage subsystem that is internal or external to the host system 102. In alternate exemplary embodiments, the data storage device 106 includes one or more solid-state devices, such as ROM, PROM, EPROM, EEPROM, flash memory, NOVRAM or any other electric, magnetic, optical or combination memory device capable of storing data (i.e., a storage medium), some of which represent executable instructions for the CPU 108. It will be understood that the data storage device 106 shown in FIG. 1 is provided for purposes of simplification and ease of explanation and is not to be construed as limiting in scope. To the contrary, there may be multiple data storage devices 106 utilized by the host system 102.

In exemplary embodiments, the host system 102 executes a virtual machine (VM) 112 that serves as an interface between applications executed on the host system 102 and lower level hardware and/or operating system interfaces of the host system 102. For example, the VM 112 may be a Java™ virtual machine (JVM™) that processes bytecode for execution by the CPU 108 of the host system 102. In exemplary embodiments, the VM 112 performs loading of classes from the data storage device 106 to the RAM 110. The VM 112 may include a class verifier 114 for performing rapid class verification during class loading. The VM 112 may also perform translation of loaded classes from bytecode into host system 102 specific instructions that are executable by the CPU 108. It will be understood that although the class verifier 114 is depicted within the VM 112, the functionality described herein can be shifted between the class verifier 114 and the VM 112, such that either may be eliminated, or subdivided into multiple modules or applications.

To enable the host system 102 to quickly startup after a reset condition while maintaining stability and security, the VM 112 can use the class verifier 114 to determine which classes have previously been verified and which must be verified prior to loading. In exemplary embodiments, the VM 112 and the class verifier 114 support two modes, a basic mode and a componentization mode. In the basic mode, as the VM 112 is loads one or more classes from the data storage device 106, such as class A 116 and class B 118, the class verifier 114 may be invoked to search verification caches 120 for corresponding records associated with each of the classes. While only two classes A 116 and B 118 are depicted in the data storage device 106, it will be understood that any number of classes can be supported. Moreover, there may be multiple verification caches 120 or a single verification cache containing records associated with class verification. The class verifier 114 may use a verification index 122 to quickly determine which classes have previously been verified, and hence which classes have a corresponding record within the verification caches 120. Alternatively, the class verifier 114 may search the verification caches 120 without using the verification index 122. In exemplary embodiments, the verification caches 120 include numerous records, such as record one 124 through record N 126, where each verification cache record holds a checksum and/or other information relating to a verified class. In searching the verification index 122 for a particular class, the class verifier 114 may use the name of the class being loaded and/or the associated class file location on the data storage device 106 as a key into the verification index 122. If a record is located within the verification caches 120 that matches the class being loaded, then the contents of the record is returned to the class verifier 114 for further processing; otherwise, a new verification cache record is created for the class.

If a record, such as record one 124, is located and returned for the class, then a checksum is calculated for the class being loaded (e.g., class A 116) and compared against the checksum in the record (e.g., the checksum in record one 124). If the checksums match, then the no new class verification is required for the class being loaded, as the class has not been modified since verification was previously performed when the record was created. Thus, unmodified, previously verified classes can be rapidly loaded without performing new verification and without risking potential problems that could arise if verification had not previously been performed. When the class verifier 114 cannot locate a record corresponding to the class being loaded, or the checksum comparison fails (i.e., the record checksum does not match the checksum of the class being loaded), then bytecode verification may be performed. Bytecode verification may include checking the bytecode of the class being loaded (e.g., class A 116) against a programming language standard to verify constraints such as: branch instructions target valid locations; data is initialized; and references are type-safe. If the bytecode verification is successful, then the checksum is written to a record for the class in the verification caches 120; otherwise, the class may not be loaded.

In exemplary embodiments, the class verifier 114 promotes program security in handling variable scoping constraints across different versions of a class. For example, assume that class A 116 and class B 118 contain the following simple lines of code given in high-level language format:

```
public class A{
    public int myint = 1;
}
public class B{
    public static void main (String[] args){
        A tmp = new A( );
        System.out.println(tmp.myint);
    }
}
```

Both of the exemplary classes A 116 and B 118 above may compile on the VM 112 and pass bytecode verification. In this example, the output of class B 118 prints the value of A.myint or "1" in this case, to the user interface 104. Assume that class A 116 is changed as follows:

```
public class A{
    private int myint=1;
}
```

Figure 2:
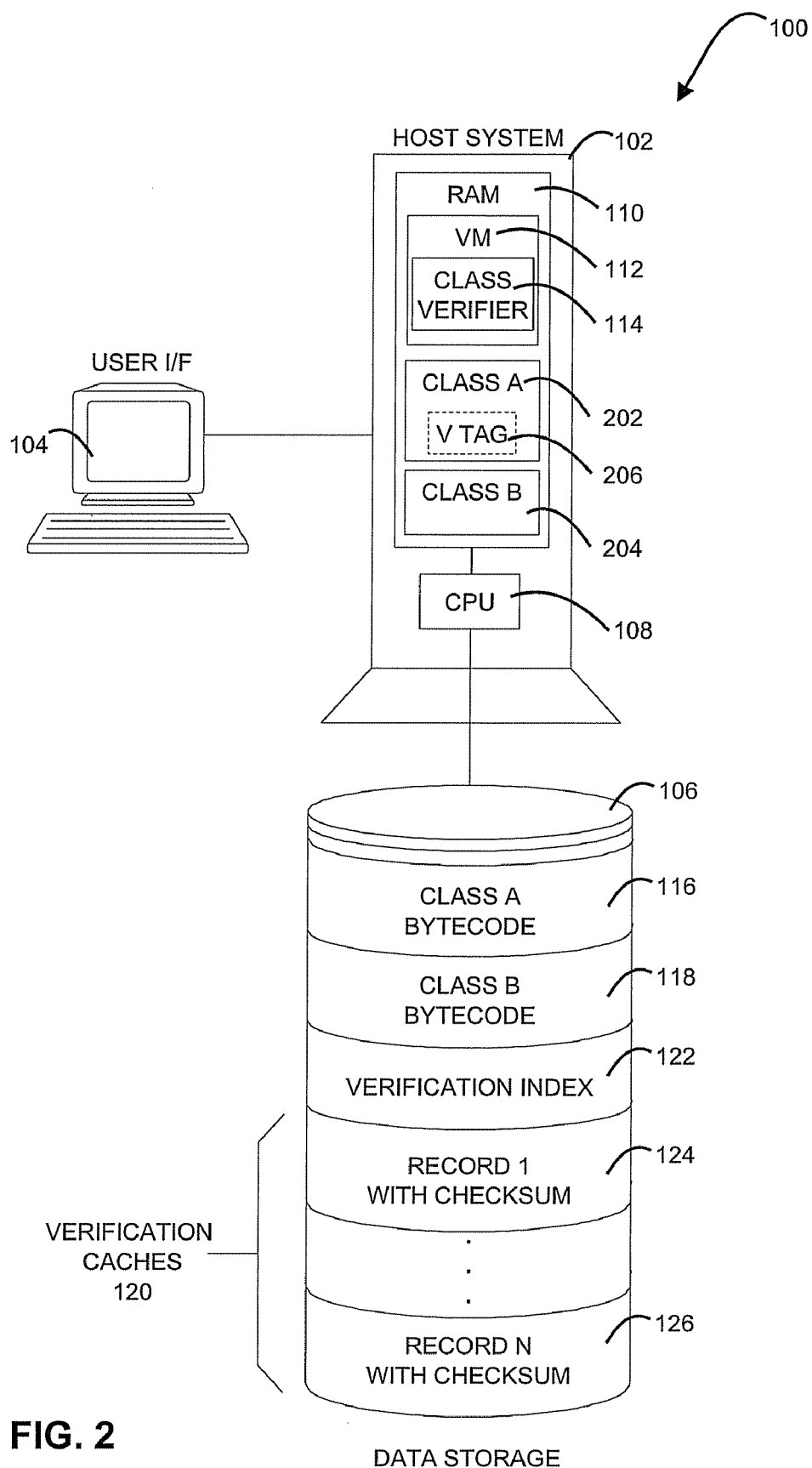
FIG. 2 depicts the system of FIG. 1 for class verification subsequent to class loading in accordance with exemplary embodiments.

Further assume that modified class A 116 is recompiled without recompiling class B 118. Now A.myint is a private variable, so class B 118 should fail when it is run; however, when class B 118 was previously compiled, A.myint was a public variable. In this case, if class verification is skipped for class B 118, then class B 118 will run successfully and print out the value of A.myint, thereby violating the scoping of class A 116 as modified. This result could compromise program security in certain situations, such as classes containing password or encryption key variables. In exemplary embodiments, the class verifier 114 handles scoping issues through applying a verification tag to newly bytecode verified classes, indicating that at least partial verification must be performed on any class attempting to access the verification tagged class. For example, in FIG. 2, the VM 112 may load class A 202 from class A 116 and class B 204 from class B 118, using the class verifier 114 for class verification. Assuming that class A 116 represents the modified class in the example above such that a checksum of class A 116 does not match the checksum with the associated record in the verification caches 120 (e.g., checksum in record one 124), then upon successful bytecode verification, a verification tag 206 is added to the loaded class A 202. Since the loaded class B 204 does not include a verification tag, indicating that it was loaded without performing verification, any attempt by loaded class B 204 to access loaded class A 202 may trigger a partial verification of loaded class B. The partial verification of loaded class B 204 need not include all verification associated with malformed bytecodes; rather, the partial verification may include verification associated with variable access to prevent scoping constraint violations. Thus, the class verifier 114 provides enhanced security while performing class verification only to the extent warranted, which minimizes startup delays.

Figure 3:
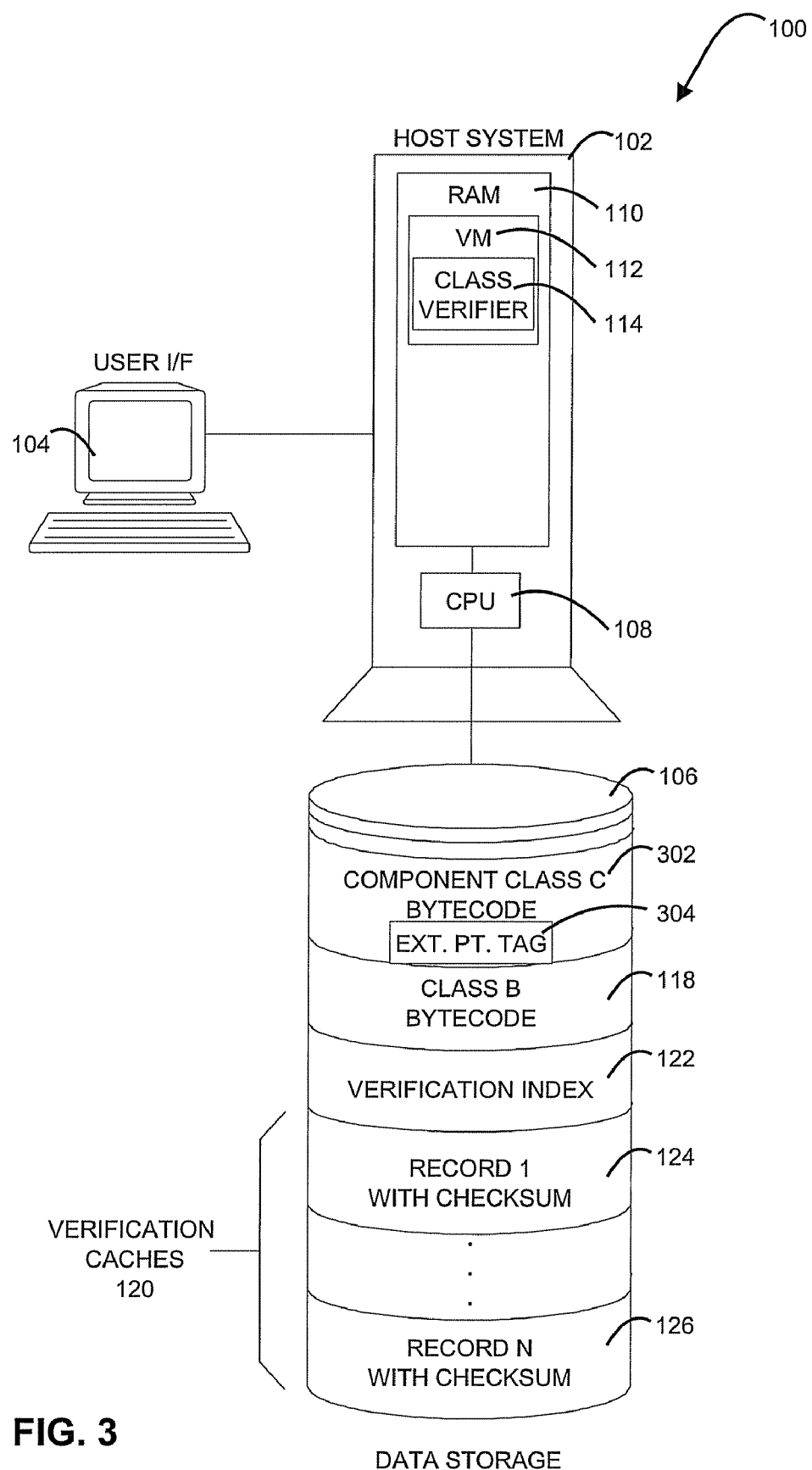
FIG. 3 depicts the system of FIG. 1 for class verification prior to component class loading in accordance with exemplary embodiments.
Figure 4:
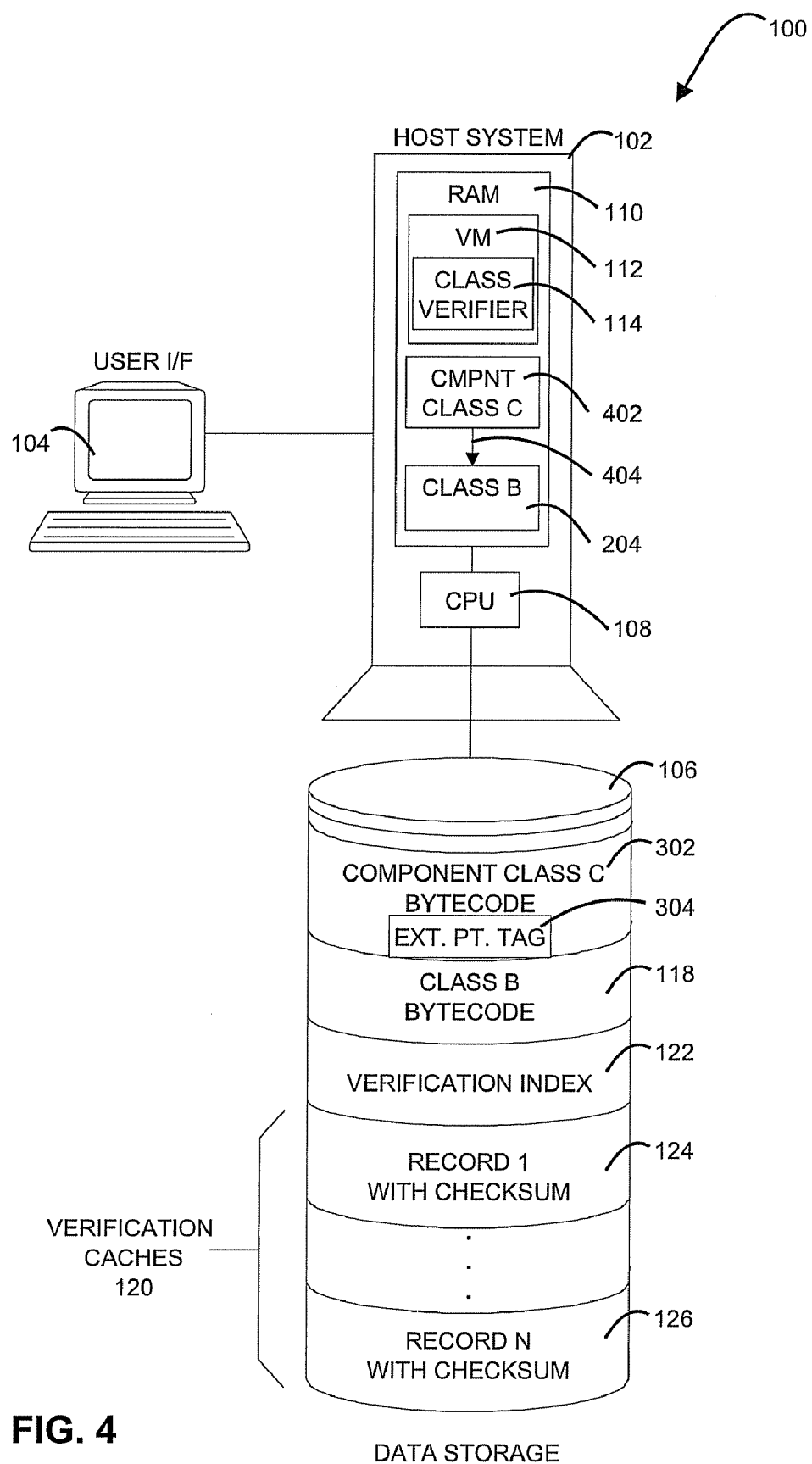
FIG. 4 depicts the system of FIG. 1 for class verification subsequent to component class loading in accordance with exemplary embodiments.

As previously discussed, the class verifier 114 has a componentization mode to support class verification of components of applications and associated classes. FIG. 3 depicts an example in which the data storage device 106 contains a component class C 302 that is associated with class B 118. In exemplary embodiments, the component class C 302 includes an extension point tag 304 as metadata to define the bounds of the component. When the VM 112 encounters a class or a method within a class tagged with an extension point tag, the VM 112 may load or create a separate verification cache record for the component. For example, when the VM 112 loads the component class C 302, and detects the extension point tag 304, the class verifier 114 can use the class name and/or class file location to look up the verification cache record (e.g., record N 126) associated with the extension point tag 304 within the verification caches 120. The extension point tag 304 of the component class C 302 may define the bounds of the component, including which classes are associated with the component, such as class B 118. Similar to the basic mode, the class verifier 114 loads the component class C 302 and the class B 118, performing individual class verification on each. In FIG. 4, the relationship between loaded component class C 402 and loaded component class B 204 is depicted as reference 404. A verification tag, such as the verification tag 206 of FIG. 2, can also be applied to the loaded component class C 402, in similar fashion as applied to the loaded class 202. While the component class C 302 is depicted with only a single relationship to the class B 118 in FIGS. 3 and 4, it will be understood that a component class can have multiple extension point tags 304 and relationships with multiple classes. Moreover, the relationships may exist at the method or function level of each component class such that multiple relationships can exist between methods or functions within each class.

Figure 5:
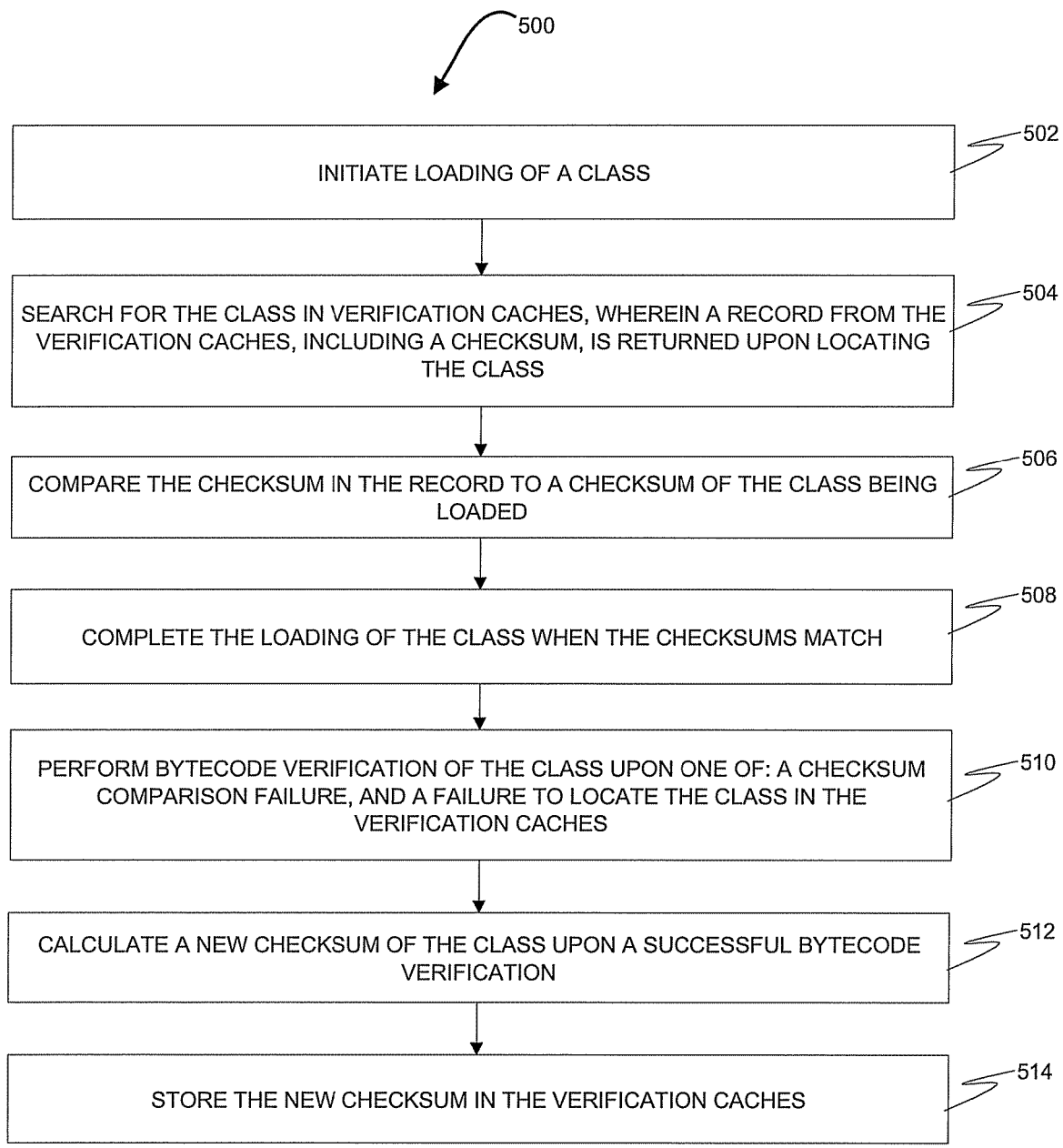
FIG. 5 depicts a process for class verification in accordance with exemplary embodiments.

Turning now to FIG. 5, a process 500 for class verification will now be described in accordance with exemplary embodiments, and in reference to FIGS. 1-4. At block 502, the VM 112 initiates the loading of a class, such as class A 116 or component class C 302. A class may be loaded when another class attempts to reference the class, or upon a specific request, such as a command input to the host system 102 via the user interface 104. If the class is a component class, a check for an extension point tag is performed (e.g., component class C 302 and extension point tag 304). The extension point tag may define a relationship between the component class and another class referenced by the component class (e.g., component class C 302 and class B 118). In exemplary embodiments, class verification is also performed on the class referenced by the component class (e.g., class B 118).

At block 504, the VM 112 invokes the class verifier 114 to search for the class in the verification caches 120. Upon locating the class, a record from the verification caches 120 including a checksum is returned, such as record one 124. The search may include using the class name as a key into the verification index 122 to locate the record for the class.

At block 506, the VM 112 compares the checksum in the record to a checksum of the class being loaded. In alternate exemplary embodiments, the class verifier 114 performs the checksum comparison. In calculating the checksum of the class being loaded, a number of checksum or similar techniques known in the art can be applied. For example, the checksum can be a two's complement summation, a CRC, an XOR summation, or a correction code (e.g., an error correction code). Through integrating directly with compression libraries of the VM 112, the checksum may be calculated on compressed class data read from a compressed class archive file (e.g., a JAR file) to further optimize the process, rather than performing decompression before computing the checksum.

At block 508, the VM 112 completes the loading of the class if the checksums match. At block 510, the VM 112 performs bytecode verification of the class if there is either a checksum comparison mismatch or a failure to locate the class in the verification caches 120. Upon a successful bytecode verification of the class, a verification tag may be applied to the loaded class, such as the verification tag 206 applied to the loaded class 202 of FIG. 2. When the VM 112 loads a class that attempts to access a verification tagged loaded class (e.g., loaded class B 204 accessing loaded class A 202 with verification tag 206), the VM 112 can perform a partial verification on the accessing class. Partial verification may include checking variable access within the accessing class to prevent scoping constraint violations. If the VM 112 detects an access error, the VM 112 can throw an exception associated with the error, which may result in an error message to the user interface 104.

At block 512, the VM 112 calculates a new checksum of the class upon a successful bytecode verification. Successful bytecode verification may be determined by scanning the bytecode for conformance with a programming language standard of the VM 112. If the class was not found within the verification caches 120 at block 504, a new record is created in the verification caches 120 to store the new checksum calculated in block 512.

At block 514, the VM 112 stores the new checksum in the verification caches 120. If there is an existing record for the class, the existing record can be updated, such as the case for a modified class that was previously verified. In exemplary embodiments, the verification caches 120 are stored on the data storage device 106 to retain the contents through a system reset or loss of power. As stated above, either the VM 112 or the class verifier 114 may perform any combination of the blocks 502-514 in the process 500.

While the exemplary embodiments as previously described refer to a virtual machine (e.g., VM 112), it will be understood that the inventive principles may be applied to any hardware and/or software component that provides equivalent or near equivalent functionality. For example, the VM 112 can include any software component that performs class loading and verification, such as part of an operating system. Moreover, any number of programming languages that have runtime and application classes loaded during execution and are interpreted/compiled dynamically in a secure runtime are included within the scope of the invention, including, but not limited to: Java™, Lisp, C#, scheme, Smalltalk, and the like.

Technical effects of exemplary embodiments include maintaining one or more verification caches to compare a class being loaded to existing class verification data, and allowing detailed class verification to be bypassed when it is determined that the class being loaded has previously been verified. Advantages of exemplary embodiments may include avoiding stale class problems associated with JXEs, and the scoping problems associated with other algorithms, such as component verification in the OSGi framework standard. As programs grow larger, the startup time and memory footprint associated with the programs may be reduced through applying the disclosed methods, systems, and computer program products. Exemplary embodiments may enable a host system to quickly startup after a reset condition by reducing the amount of time required to perform class verification, while maintaining system stability and security.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) flash drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for class verification, comprising:
   initiating, with a host computing system, loading of a class;
   searching, with the host computing system, for the class in verification caches, wherein a record from the verification caches, including a checksum, is returned upon locating the class;
   comparing, with the host computing system, the checksum in the record to a checksum of the class being loaded;
   completing, with the host computing system, the loading of the class when the checksums match;
   performing, with the host computing system, bytecode verification of the class upon one of: a checksum comparison mismatch, and a failure to locate the class in the verification caches;
   calculating, with the host computing system, a new checksum of the class upon a successful bytecode verification; and
   storing, with the host computing system, the new checksum in the verification caches.

2. The method of claim 1 further comprising:
   creating a new record in the verification caches upon a failure to locate the class in the verification caches, wherein the new checksum is stored in the new record.

3. The method of claim 1 wherein searching for the class in a verification cache further comprises using the class name as a key into a verification index to locate the record for the class.

4. The method of claim 1 wherein performing bytecode verification includes scanning the bytecode for conformance with a programming language standard.

5. The method of claim 1 wherein the class is a component class and further comprising:
   checking the component class for an extension point tag, wherein the extension point tag defines a relationship between the component class and another class referenced by the component class.

6. The method of claim 5 further comprising performing class verification on the class referenced by the component class.

7. The method of claim 1 wherein the class is a compressed file, and the checksum of the class is calculated without decompressing the compressed file.

8. The method of claim 1 further comprising:
   applying a verification tag to the loaded class upon a successful bytecode verification of the class; and
   performing a partial verification on a class attempting to access verification tagged loaded class, wherein the partial verification includes checking variable access to prevent scoping constraint violations.

9. A system for class verification, comprising:
   a data storage device holding verification caches; and
   a host system in communication with the data storage device, the host system executing a virtual machine (VM), including a class verifier, the VM performing:
   initiating loading of a class;
   searching for the class in the verification caches, wherein a record from the verification caches, including a checksum, is returned upon locating the class;
   comparing the checksum in the record to a checksum of the class being loaded;
   completing the loading of the class when the checksums match;

performing bytecode verification of the class upon one of: a checksum comparison mismatch, and a failure to locate the class in the verification caches;

calculating a new checksum of the class upon a successful bytecode verification; and storing the new checksum in the verification caches.

10. The system of claim 9 wherein the VM further performs:

creating a new record in the verification caches upon a failure to locate the class in the verification caches, wherein the new checksum is stored in the new record.

11. The system of claim 9 wherein searching for the class in a verification cache further comprises using the class name as a key into a verification index to locate the record for the class.

12. The system of claim 9 wherein performing bytecode verification includes scanning the bytecode for conformance with a programming language standard.

13. The system of claim 9 wherein the class is a component class and the VM further performs:

checking the component class for an extension point tag, wherein the extension point tag defines a relationship between the component class and another class referenced by the component class.

14. The system of claim 13 wherein the VM further performs class verification on the class referenced by the component class.

15. The system of claim 9 wherein the class is a compressed file, and the checksum of the class is calculated without decompressing the compressed file.

16. The system of claim 9 wherein the VM further performs:

applying a verification tag to the loaded class upon a successful bytecode verification of the class; and performing a partial verification on a class attempting to access verification tagged loaded class, wherein the partial verification includes checking variable access to prevent scoping constraint violations.

17. A computer program product for class verification, the computer program product comprising:

a storage medium readable by a processing circuit and storing instructions for execution by the processing circuit for implementing a method, the method comprising:

initiating loading of a class;

searching for the class in verification caches, wherein a record from the verification caches, including a checksum, is returned upon locating the class;

comparing the checksum in the record to a checksum of the class being loaded;

completing the loading of the class when the checksums match;

performing bytecode verification of the class upon one of: a checksum comparison mismatch, and a failure to locate the class in the verification caches;

calculating a new checksum of the class upon a successful bytecode verification; and storing the new checksum in the verification caches.

18. The computer program product of claim 17 wherein the class is a component class and further comprising:

checking the component class for an extension point tag, wherein the extension point tag defines a relationship between the component class and another class referenced by the component class; and performing class verification on the class referenced by the component class.

19. The computer program product of claim 17 wherein the class is a compressed file, and the checksum of the class is calculated without decompressing the compressed file.

20. The computer program product of claim 17 further comprising:

applying a verification tag to the loaded class upon a successful bytecode verification of the class; and performing a partial verification on a class attempting to access verification tagged loaded class, wherein the partial verification includes checking variable access to prevent scoping constraint violations.

* * * * *